United States Patent [19]
Gilmore

[11] 3,951,018
[45] Apr. 20, 1976

[54] PIPE BEVELING DEVICE
[76] Inventor: Guy T. Gilmore, 9214 Albaren, Houston, Tex. 77036
[22] Filed: Dec. 6, 1974
[21] Appl. No.: 530,436

[52] U.S. Cl. .................................................. 82/4 C
[51] Int. Cl.² .......................... B23B 5/16; B23B 5/08
[58] Field of Search .................................... 82/4 C

[56] References Cited
UNITED STATES PATENTS

| 1,099,215 | 6/1914 | Sullivan | 82/4 C |
|---|---|---|---|
| 1,841,550 | 1/1932 | Parker | 82/4 C |
| 2,227,348 | 12/1940 | Johnson | 82/4 C |
| 2,289,631 | 7/1942 | Cuda et al. | 82/4 C |
| 2,351,217 | 6/1944 | Kopp | 82/4 C |
| 3,807,047 | 4/1974 | Sherer et al. | 82/4 C |

Primary Examiner—Leonidas Vlachos
Attorney, Agent, or Firm—Ranseler O. Wyatt

[57] ABSTRACT

A pipe beveling machine for forming a beveled end to receive a weld, having a driving mechanism and a driven mechanism, the driving mechanism being movable into driving relation with the driven mechanism and the driven mechanism having means for anchoring a portion thereof into the work, moving slips against the inside wall thereof and being keyed to the driving mechanism, and a cutting head which extends laterally from the driven mechanism and is provided with a feed mechanism for moving the cutter into the work, said cutter being mounted in a pivotal cutter holder and being advanced into the work with each revolution of the driven mechanism.

1 Claim, 5 Drawing Figures

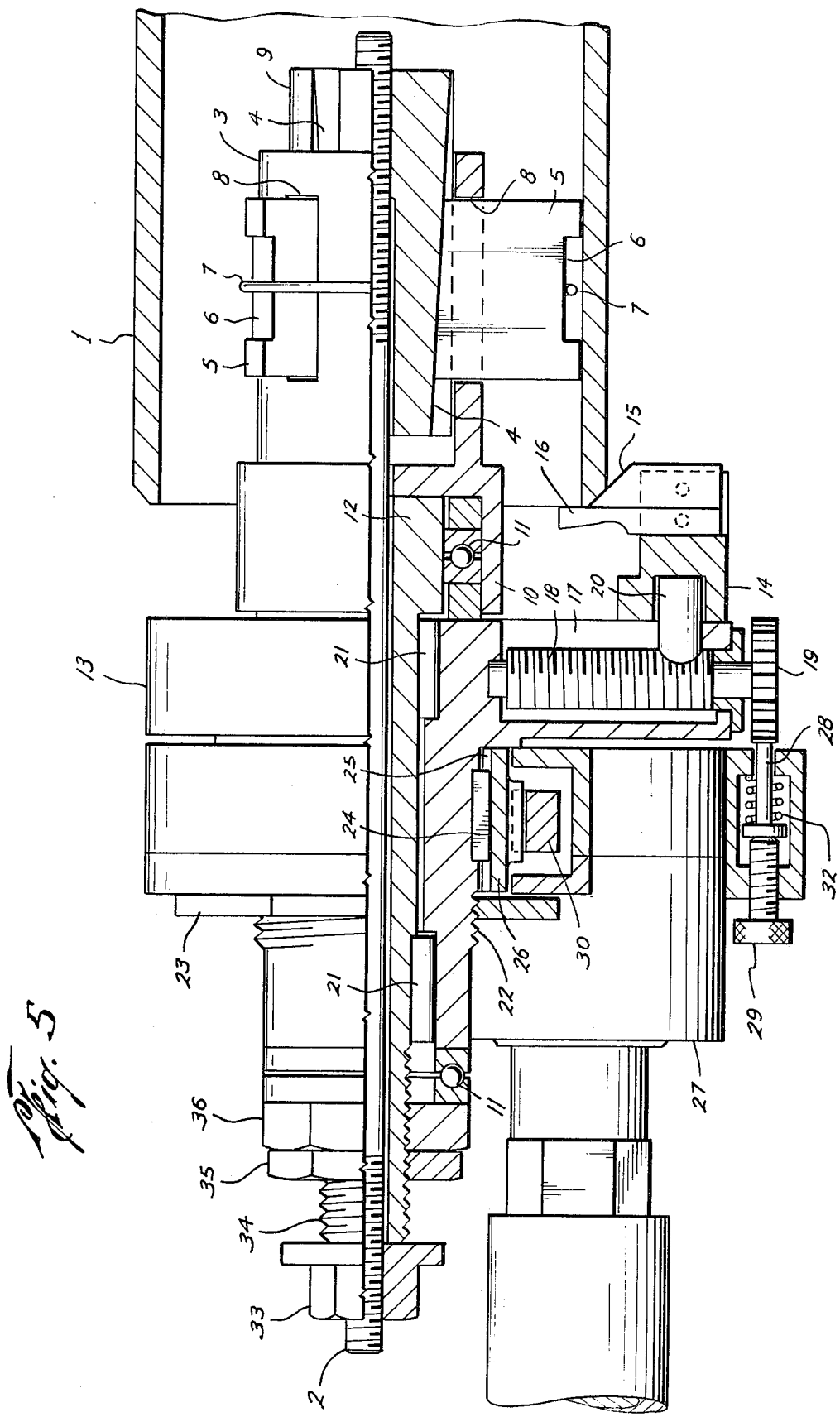

PIPE BEVELING DEVICE

BACKGROUND OF THE INVENTION

In many instances where the conduit system of a heat exchange unit, for example, needs cleaning, it is necessary to remove the U-shaped connecting end members, and to do this, a blow-arc system is employed, which removes the connecting members, but leaves a damaged and rough end of the pipe. This condition is not susceptible to a good weld. The pipe therefore must be cut off back of the area affected by the blow-arc cut. The metal, normally employed in such a device, is inconel, or similarly hard metal, very difficult to cut, and often extremely difficult to prepare such material for welding.

SUMMARY OF THE INVENTION

A pipe beveling device, having a rotatable cutter head and a pivotally mounted cutter holder attached thereon having means for progressively feeding a cutter in the cutter holder to the work for beveling the end of the pipe at the desired angle and forming a flat face at the end of the pipe, so that after the end of the abutting elbow, or turn, has been similarly treated, the ends of the pipe may be properly welded together. The device is mounted on the work by having means to be inserted into the pipe and to be moved into engaging position with the inside walls of the pipe ahd, when the cut is completed, to disengage from the work.

BRIEF DESCRIPTION OF THE DRAWINGS

FIG. 5 is a side elevational view, partially in cross section, of the entire device mounted in the work.

DESCRIPTION OF THE PREFERRED EMBODIMENT

Figure 1:
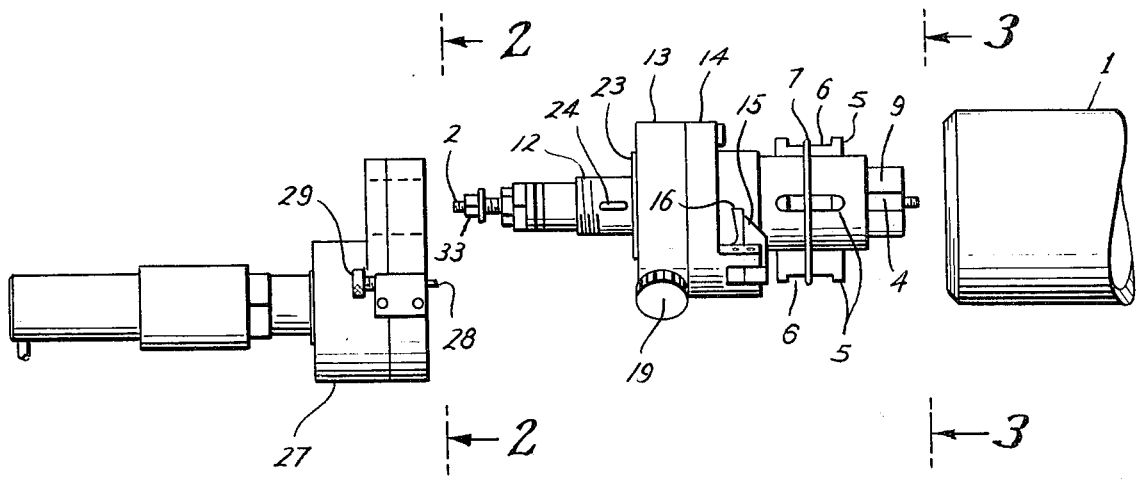
FIG. 1 is an exploded side elevational view of the driving mechanism, the cutter and the work.
Figure 2:
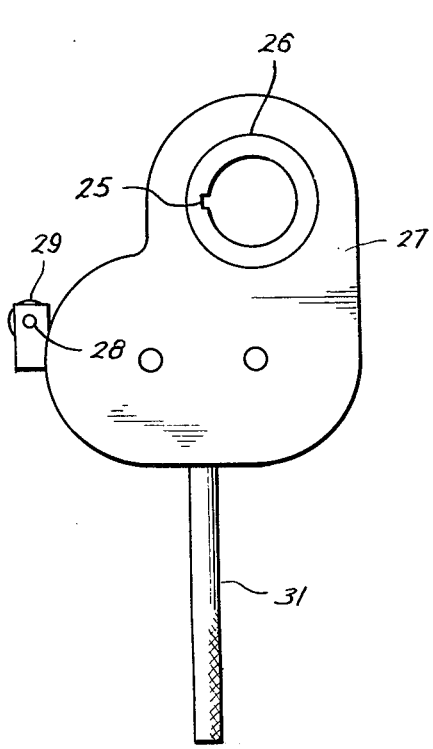
FIG. 2 is a cross sectional end view taken on the line 2—2 of FIG. 1.
Figure 3:
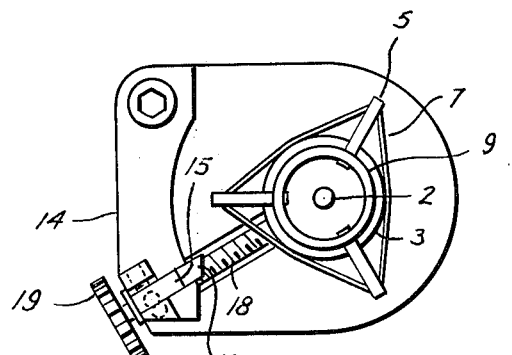
FIG. 3 is a cross sectional end view taken on the line 3—3 of FIG. 1.
Figure 4:
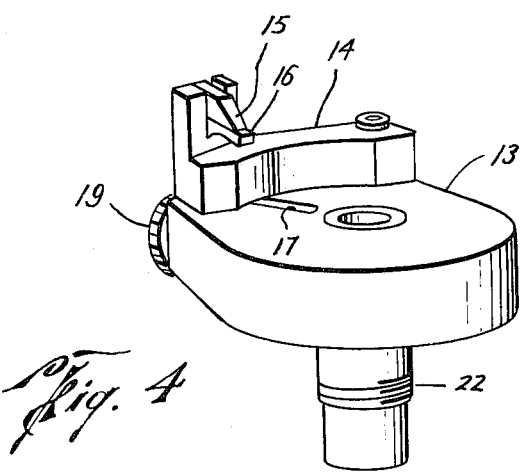
FIG. 4 is a side elevational view of the cutter head assembly.

In the drawings the numeral 1 designates a tubular member on which the bevel is to be formed, and into which the slip assembly extends. A longitudinal shaft, having externally threaded areas adjacent both ends, extends through the inner housing 34. The upper end of the housing 34 is externally threaded and has the lock nuts 35, 36 mounted thereon. The control nut 33 mounted on the one end of the shaft 2, bears against the nut 34, and moves the shaft 2 longitudinally as it is rotated. A slip housing 3 is mounted on the other end of the shaft 2, and one end thereof abuts the inner housing 34 and adjacent the other end are the slips 5, 5 which have one end seated in the slanted grooves 4 formed in the mandrel 9. The ends of the slips 5, 5 which fit in the grooves 4, are also slanted to match the slope of the grooves, and the other ends of the slips have notches 6, 6 to receive the spring 7, which maintains the slips normally in abutting relation with the mandrel. Longitudinal slots 8, 8 are formed in the housing 3 through which the slips 5 extend.

Formed in the upper end of the housing 3 is the thrust bearing housing 10 in which one of the thrust bearings 11, 11 is mounted and into which the enlarged portion 12 of the inner housing 34 extends. Mounted on the shaft 2 is the cutter head 13 having the outwardly extended area on which the cutter holder 14 is pivotally mounted and which holds the tool cutters 15, 16. A slot 17 receives the adjusting screw 18 having the toothed wheel 19 on the outer end thereof, and a pawl 20 in contact with the threads on the screw 18, moves the work holder 14 into the work as the screw 18 is rotated.

Needle bearings 21, 21 permit the cutter head assembly to rotate on the inner housing 34, as the thrust bearings 11, 11 maintain the inner housing 34 and cutter head assembly in rotatable relation. The nuts 35, 36 maintain the parts in assembled relation and the the cutter head assembly also has the nut 23 mounted on the externally threaded portion of the inner housing as 22, to maintain the cutter head in position on the houing. A slot formed in the external surface of the inner housing receives the key 24, which also fits into a slot as 25 in the gear 26 in the driving mechanism 27, which in turn rotates through a suitable gear train as 30 in the driving mechanism. Mounted on the outer wall of the driving mechanism 27 is the yieldably mounted feed bar 28, which is provided with a spring 32 to maintain the same in contact with the screw 29 and which is adjustable by the adjusting screw 29, as the cutter head rotates, the wheel 19 will contact the bar 28, one time during each revolktion, and will be rotated the distance of one tooth, and will rotate the shaft 18, which in turn moves the work holder 14, through the pawl 20, into the work. When the bevel cut is completed, the straight cutting tool 16 will cut the flat face on the end of the work. A handle 31 is provided on the driving mechanism 27 to hold same against rotation as the mechanism is in operation.

To mount the device on the work, the slips 5, 5 are in retracted position, and the end of the tool having the slips is inserted in the pipe, and the nut 33 rotated to move the shaft outwardly, thus moving the slips 5 outwardly as the housing 9 moves outwardly with the shaft 2, the slanted ends of the slips sliding in the slanted grooves, moving the opposite ends of the slips outwardly against the inside wall of the pipe. When the assembly is thus anchored securely in the work, the driving mechanism 27 is moved onto the housing and the key 24 engaged in the slot 35 and the slot 25 of the driving mechanism, screw 29 rotated to adjust the pin 29 for the proper contact with the wheel 19. As the driving mechanism rotates the cutter head, the cutter head will be progressively moved into the work, and after the bevel is formed, the flat face is cut by the tool 16, and the work is completed. The nut 33 is then reversed, and the shaft 2 moved inwardly, and the spring 7 will retract the slips in the slanted grooves, and the unit may be removed from the work.

What I claim is:

1. A pipe beveling device having a longitudinal axial shaft, said shaft being externally threaded adjacent the respective ends thereof, an anchor assembly mounted on one end of said shaft having transversely movable slips, means for yieldably maintaining said slips in retracted position, an inner housing mounted on said shaft and one end of which abuts said anchor assembly, a cutter head assembly mounted on said inner housing having a driving mechanism for rotating said cutter head and having a cutter holder and cutter feeding means, cutters in said cutter holder adjustable to simultaneously cut a bevel and a flat face on the end of a pipe, wherein said feeder means consists of a spring loaded pin mounted on said driving means, one end of said pin being constantly urged in one direction and a screw having one end abutting the other end of said pin and adopted to move said pin longitudinally, a threaded shaft rotatably mounted in said cutter head, one end of which has fixedly mounted thereon an enlarged toothed wheel, adapted to be engaged and rotated by said pin upon each revolution of the cutter head and a pawl having one end in mesh with the threads of said shaft and the other end mounted in a cutter to move said cutter into the pipe to be cut.

* * * * *